United States Patent
Leonard

(10) Patent No.: US 8,613,430 B2
(45) Date of Patent: Dec. 24, 2013

(54) GAS SPRING ASSEMBLY AND SUSPENSION SYSTEM INCLUDING SAME

(75) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 904 days.

(21) Appl. No.: 12/416,743

(22) Filed: Apr. 1, 2009

(65) Prior Publication Data

US 2010/0252970 A1    Oct. 7, 2010

(51) Int. Cl.
*F16F 9/04* (2006.01)

(52) U.S. Cl.
USPC ............. 267/64.19; 267/64.21; 267/64.23; 267/64.24; 267/64.27

(58) Field of Classification Search
USPC ........... 267/64.19, 64.21, 64.23, 64.24, 64.27
See application file for complete search history.

(56) References Cited

U.S. PATENT DOCUMENTS

| | | | |
|---|---|---|---|
| 3,721,417 A | 3/1973 | Skala et al. | |
| 4,786,035 A | 11/1988 | Elliott | |
| 4,915,557 A * | 4/1990 | Stafford | 411/107 |
| 5,060,916 A | 10/1991 | Koschinat et al. | |
| 5,941,510 A | 8/1999 | Grass et al. | |
| 6,024,343 A | 2/2000 | Ebert | |
| 6,070,861 A | 6/2000 | Ecktman | |
| 6,113,081 A | 9/2000 | Hilburger et al. | |
| 6,234,460 B1 | 5/2001 | Arnold | |
| 6,460,836 B1 | 10/2002 | Trowbridge | |
| 7,497,423 B2 * | 3/2009 | Myers | 267/64.27 |
| 7,530,554 B2 * | 5/2009 | Levy | 267/64.27 |
| 8,069,596 B2 * | 12/2011 | Maier-Hunke | 40/493 |
| 2007/0114706 A1 | 5/2007 | Myers | |
| 2007/0210550 A1 | 9/2007 | Levy | |
| 2008/0246198 A1 | 10/2008 | Levy et al. | |

FOREIGN PATENT DOCUMENTS

| | | |
|---|---|---|
| DE | 197 20 776 A1 | 11/1998 |
| EP | 0 160 371 | 11/1985 |
| EP | 0 296 445 A2 | 12/1988 |
| EP | 1 041 308 A1 | 10/2000 |
| EP | 1 300 264 A2 | 4/2003 |
| WO | WO 00/70238 A | 11/2000 |
| WO | WO 02/35113 A | 5/2002 |

OTHER PUBLICATIONS

European Search Report, dated Jun. 8, 2011, in connection with European Appln. No. 10003673.0, filed Apr. 1, 2010.

* cited by examiner

*Primary Examiner* — Paul N. Dickson
*Assistant Examiner* — Syed A Islam
(74) *Attorney, Agent, or Firm* — Jason A. Houser; Fay Sharpe LLP

(57) ABSTRACT

A gas spring assembly includes a first end member and a second end member spaced from the first end member. A flexible wall extends between the first end member and the second end member such that a spring chamber is at least partially defined therebetween. A biasing assembly is operative to urge an end of the flexible wall into abutting engagement with the second end member and operative to permit the end of the flexible wall to be separated a distance from the second end member while in the assembled condition. A gas suspension system is also included.

17 Claims, 4 Drawing Sheets

GAS SPRING ASSEMBLY AND SUSPENSION SYSTEM INCLUDING SAME

BACKGROUND

The subject matter of the present disclosure broadly relates to the art of spring devices and, more particularly, a gas spring assembly that includes a biasing assembly as well as a suspension system including such a gas spring assembly.

The subject matter of the present disclosure finds particular application and use in conjunction with suspension systems of wheeled vehicles, and will be shown and described herein with reference thereto. However, it is to be appreciated that the subject matter of the present disclosure is also amenable to use in other applications and environments, and that the specific uses shown and described herein are merely exemplary. Accordingly, the subject matter of the present disclosure is not intended to be limited to use associated with vehicle suspensions.

The problems associated with overextending a gas spring assembly such that the flexible wall thereof is tensioned between the opposing end members are generally well known. Such problems can include the undesirable formation of leak paths and the degeneration of otherwise substantially fluid-tight sealing arrangements. In some circumstances, one or more components of the gas spring assembly can even become damaged or otherwise adversely affected. Accordingly, various arrangements have been proposed to prevent the occurrence of such overextension or to at least minimize the effect that such an event has on the structure and performance of the gas spring assembly.

One example of an arrangement that operates to limit or otherwise prevent overextension is shown in U.S. Pat. No. 6,402,128 ('128) to Trowbridge. The '128 patent discloses an air spring having an end member, a main piston spaced from the end member and a flexible wall secured therebetween in a conventional arrangement. The '128 patent also describes a restraining piston that is telescopically received within the main piston. An end of the restraining piston extends outwardly beyond the main piston and is secured to the end member. While various features of the restraining piston in the '128 patent provide other functional aspects of the air spring, the restraining piston also acts as a positive stop to prevent excessive separation of the end member and the main piston. Such excessive separation would tension the flexible wall of the air spring and, thus, possibly damaged or otherwise adversely affect the same due to the occurrence of an overextended condition. The '128 patent is hereby incorporated by reference as background material for showing the same and which forms part of this specification.

One example of an arrangement that operates to minimize the detrimental effect of excessive separation of the end members of a gas spring assembly is shown and described in published U.S. Patent Application 2007/0114706 ('706) to Myers, which is also hereby incorporated by reference as background material for showing the same and which forms part of this specification. In the '706 publication, a telescoping piston assembly is utilized that includes two sections. One section can be secured on or along a structural component with the second section being capable of displacement relative to the first section. An end of the flexible wall of the gas spring assembly is secured on the second section. This permits the end of the flexible wall that is secured on or along the second section to move away from the first section and any corresponding structural component to which the first section may be secured. Permitting this movement of the end of the flexible wall acts to minimize the effect of extending the gas spring assembly beyond the normal operating range thereof.

While these arrangements have been effective in preventing the occurrence of overextended conditions or to at least minimizing the effect that such events have on the structure and performance of the gas spring assembly, it is believed beneficial to continue to develop constructions that prevent the occurrence of such overextension and/or minimize the effect that such events have on the structure and performance of a gas spring assembly. For example, such further developments could improve the robustness and/or performance of such constructions, and/or decrease costs associated with the use thereof, such as manufacturing, installation and/or maintenance costs.

BRIEF DESCRIPTION

A gas spring assembly in accordance with the subject matter of the present disclosure that is capable of use between an associated sprung mass and an associated unsprung mass is provided that includes a first end member adapted for securement on one of the associated sprung and unsprung masses. A second end member is disposed in spaced relation to the first end member and defines an axis of motion therebetween. The second end member is adapted for securement on the other of the associated sprung and unsprung masses. A flexible wall has a first end, an opposing second end and a chamber at least partially defined therebetween. The first end is secured to the first end member such that a substantially fluid-tight seal is formed therewith. An end closure is shaped to cooperatively engage the second end member. The end closure extends across the second end such that a substantially fluid-tight seal is formed between the flexible wall and the end closure. A biasing assembly joins the flexible member to the second end member. The biasing assembly allows controlled relative movement between the second end of the flexible wall and the second end member.

A gas spring assembly in accordance with the subject matter of the present disclosure is provided that includes a first end member and a second end member that is spaced from the first end member. A flexible wall extends between the first end member and the second end member that at least partially defines a spring chamber therebetween. A biasing assembly is operative to urge an end of the flexible wall into abutting engagement with the second end member and is operative to permit the end of the flexible wall to be separated a distance from the second end member while in the assembled condition.

A gas suspension system in accordance with the subject matter of the present disclosure is provided for use on an associated vehicle that includes an associated sprung mass and an associated unsprung mass. The gas suspension system includes an upper structural member of the associated sprung mass and a lower structural member of the associated unsprung mass that is spaced apart from the upper structural member and displaceable relative thereto. A gas spring assembly is operatively connected between the upper and lower structural members and includes an end member secured on the upper structural member and a piston that is spaced from the end member and secured on the second structural member. The gas spring assembly also includes a flexible wall extending between the end member and the piston that at least partially defines a spring chamber therebetween. The gas spring assembly further includes a biasing assembly that is operative to urge an end of the flexible wall into abutting engagement with the piston and operative to permit the end of the flexible wall to be disengaged from the piston while remaining in an assembled condition. The upper and lower structural members are capable of being spaced a first distance from one another at which the gas spring assembly is at a full operating height in which the end of the flexible wall of the gas spring assembly is in abutting engagement with the piston thereof. The upper and lower structural members are also capable of being spaced a second distance from one another that is less than the first distance and at which the gas spring assembly is at a collapsed height. The upper and lower structural members are also capable of being spaced a third distance from one another that is greater than the first distance and at which the gas spring assembly is extended beyond the full operating height such that the end of the flexible wall of the gas spring assembly is disengaged from the piston.

DETAILED DESCRIPTION

Figure 1:
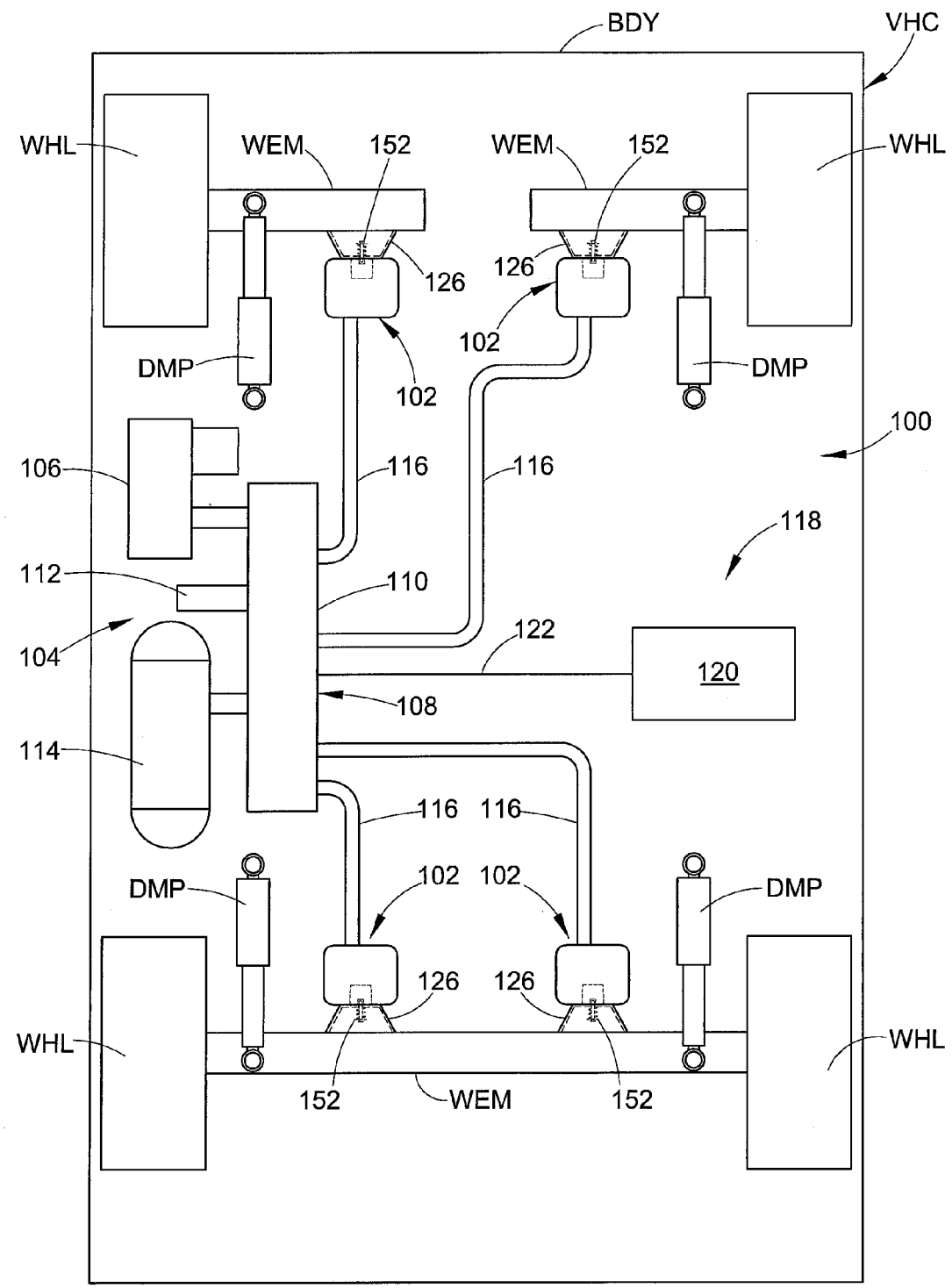
FIG. 1 is a schematic representation of one exemplary embodiment of a vehicle suspension system that includes a gas spring assembly in accordance with the subject matter of the present disclosure.

Turning now to the drawings, wherein the showings are for the purpose of illustrating exemplary embodiments of the subject matter of the present disclosure and which are not intended to limit the same, FIG. 1 illustrates one example of a gas suspension system 100 disposed between a sprung mass, such as an associated vehicle body BDY, for example, and an unsprung mass, such as an associated wheel WHL or an associated wheel-engaging member WEM, for example, of an associated vehicle VHC. It will be appreciated that any such gas suspension system can include any number of one or more systems, components and/or devices and that the same can be operatively connected between the sprung and unsprung masses of the associated vehicle in any suitable manner. For example, such a gas suspension system can optionally include a plurality of damping members, such as dampers DMP, for example, that can be operatively connected between the sprung and unsprung masses of the associated vehicle in any suitable manner.

A gas suspension system in accordance with the subject matter of the present disclosure also includes a plurality of gas spring assemblies that are supported between the sprung and unsprung masses of the associated vehicle. In the embodiment shown in FIG. 1, gas suspension system 100 includes four gas spring assemblies 102, one of which is disposed toward each corner of the associated vehicle adjacent a corresponding wheel WHL. However, it will be appreciated that any other suitable number of gas spring assemblies could alternately be used, in any other suitable configuration or arrangement. As shown in FIG. 1, gas spring assemblies 102 are supported between wheel-engaging members WEM and body BDY of associated vehicle VHC. Additionally, it will be recognized that the gas spring assemblies shown and described herein (e.g., gas spring assemblies 102) are of a rolling lobe-type construction. However, it will be appreciated that the present novel concept may be utilized in association with any other suitable gas spring assembly arrangements and/or construction.

Gas suspension system 100 also includes a pressurized gas supply system 104 that is operatively associated with the gas spring assemblies for selectively supplying pressurized gas (e.g., air) thereto and selectively transferring pressurized gas (e.g., air) therefrom. In the exemplary embodiment shown in FIG. 1, gas supply system 104 includes a pressurized gas source, such as a compressor 106, for example, for generating pressurized air or other gases. The gas supply system can also include any number of one or more gas flow control devices of any suitable type, kind and/or construction as may be capable of effecting the selective transfer of pressurized gas. For example, a valve assembly 108 is shown as being in communication with compressor 106 and can be of any suitable configuration or arrangement. In the exemplary embodiment shown, valve assembly 108 includes a valve block 110 with a plurality of valves (not shown) supported thereon. Valve assembly 108 can also optionally include a suitable exhaust, such as a muffler 112, for example, for venting pressurized gas from the system. Optionally, pressurized gas supply system 104 can also include a reservoir 114 in fluid communication with valve assembly 108 and suitable for storing pressurized gas.

The one or more control devices, such as valve assembly 108, for example, can be in communication with gas spring assemblies 102 in any suitable manner, such as, for example, through suitable transmission lines 116. As such, pressurized gas can be selectively transmitted to and/or from the gas springs through valve assembly 108, such as to alter or maintain vehicle height at one or more corners of the vehicle, for example.

Gas suspension system 100 is also shown as including an optional control system 118 that is capable of communication with any one or more other systems and/or components (not shown) of gas suspension system 100 and/or of which VHC for selective operation and control of the gas suspension system. Control system 118 includes a controller or electronic control unit (ECU) 120 in communication with compressor 106 and/or valve assembly 108, such as through a conductor or lead 122, for example, for selective operation and control thereof, including supplying and exhausting pressurized fluid to and from gas spring assemblies 102. Controller 120 can be of any suitable type, kind and/or configuration.

Control system 118 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may respectively operate using ultrasonic or electromagnetic waves, for example.

Figure 2:
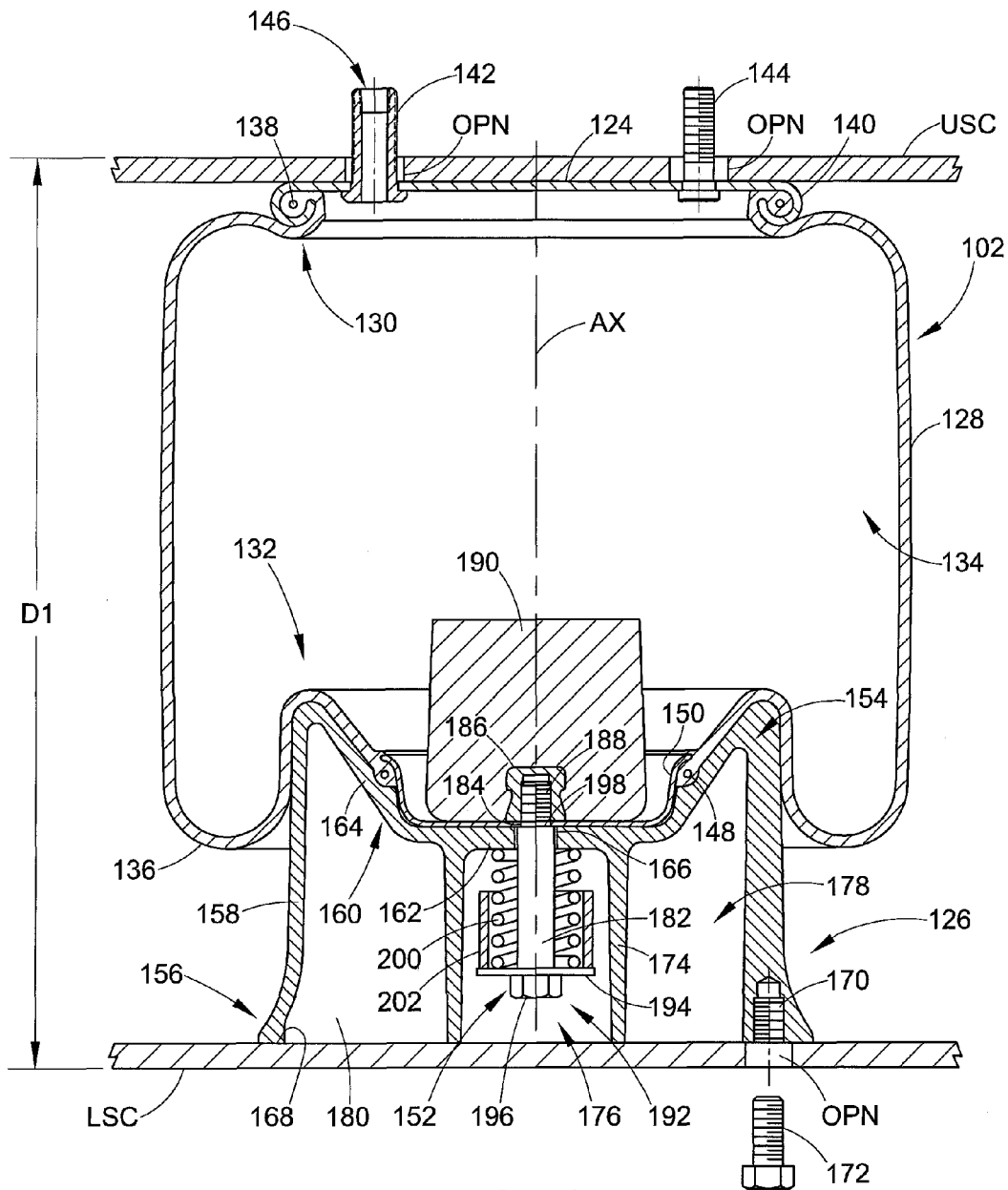
FIG. 2 is a side view of one exemplary embodiment of a gas spring assembly in accordance with the subject matter of the present disclosure shown at a normal operating condition.
Figure 3:
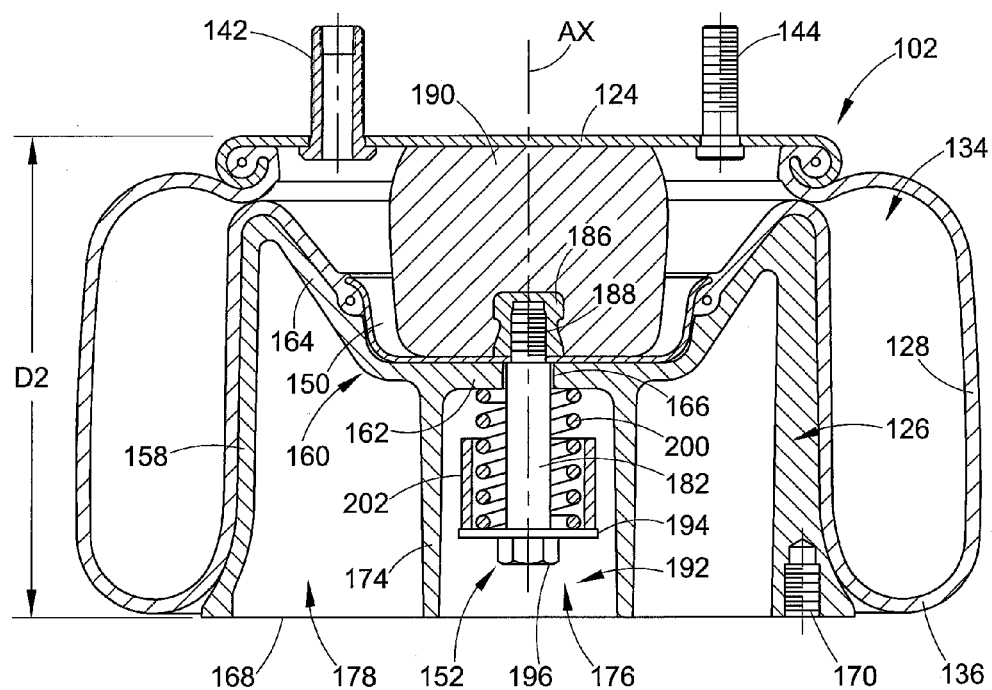
FIG. 3 is a side view of the gas spring assembly in FIG. 2 shown in a collapsed condition.
Figure 4:
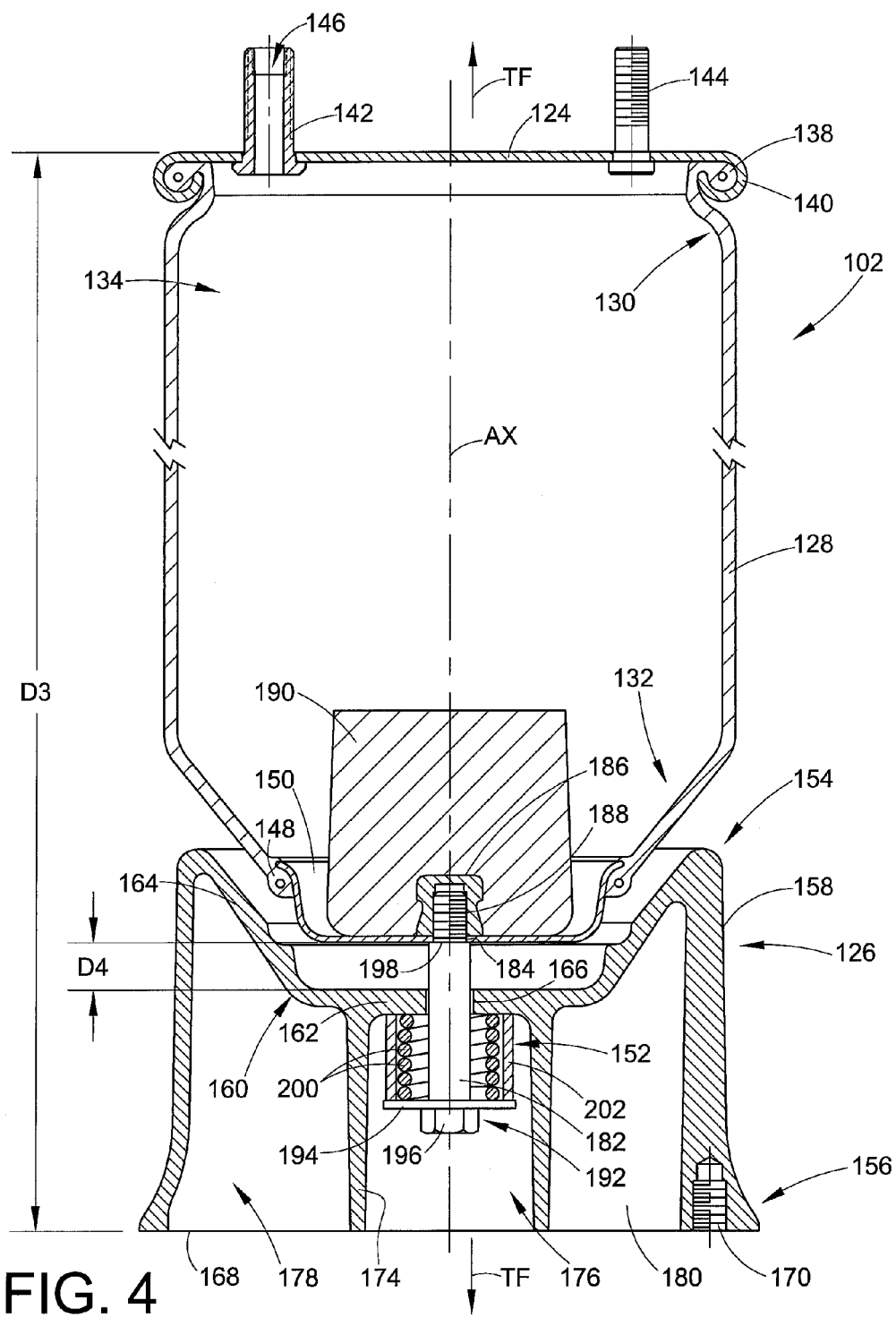
FIG. 4 is a side view of the gas spring assembly in FIG. 2 shown in an extended condition in which an end of the flexible wall is disengaged from an end member thereof.

Turning now to FIGS. 2-4, gas spring assembly 102 is shown supported between an upper structural component USC and an opposing lower structural component LSC, which components are merely representative of structural components of any suitable type, kind and/or configuration, such as body BDY and wheel-engaging member WEM of vehicle VHC in FIG. 1, for example. Upper and lower structural components USC and LSC are shown as being disposed a first distance apart from one another, as is indicated by reference dimension D1. It will be appreciated that this first distance can correspond to an operating height that is within the normal range of operation for gas spring assembly 102, such as may be referred to as a design height, for example.

Gas spring assembly 102 includes a longitudinally extending axis AX and is capable of displacement (i.e., extension and compression) in a generally longitudinal manner. Gas spring assembly 102 also includes a first end member, such as a bead plate 124, for example, and a second end member, such as a piston 126, for example, that is spaced longitudinally from the first end member. A flexible wall 128 extends between the first and second end members. The flexible wall includes opposing first and second ends 130 and 132 and at least partially defines a spring chamber 134 formed between the first and second end members. As a preferred arrangement, flexible wall 128 is shown and described herein as being of an elongated sleeve-type configuration that is capable of forming a rolling lobe 136 along the exterior of an end member, such as piston 126, for example. However, it will be appreciated that other constructions could alternately be used.

Flexible wall 128 can be secured on or along the first end member (e.g., bead plate 124) in any suitable manner. For example, first end 130 can include a mounting feature, such as a mounting bead 138, for example, that can be secured along an outer peripheral wall portion 140 of bead plate 124, such as by using a crimped connection, for example, to form a substantially fluid-tight seal between the end member and the flexible wall. Additionally, the first end member can be operatively connected to upper structural component USC in any suitable manner. For example, threaded mounting studs 142 and 144 can extend through openings OPN in the upper structural component for receiving threaded nuts (not shown) or other suitable securement components. Fluid communication with spring chamber 134 can, for example, be provided through the first end member in a suitable manner, such as though a passage 146 in mounting stud 142, for example.

As can be observed from FIGS. 2-4, however, second end 132 is not attached or otherwise fixedly captured by the second end member (e.g., piston 126). Rather, a third end member is shown as extending across the opening formed along second end 132 and, in a preferred arrangement, forms a substantially fluid-tight seal therewith along a bead wire 148 on the second end. Such a third end member is commonly referred to in the art as an end closure, which end closure is identified in FIGS. 2-4 by item number 150. Second end 132 of flexible wall 128 is maintained in abutting engagement with the second end member (e.g., piston 126) through the use of a biasing assembly 152 that can be operatively connected therebetween in any suitable manner. In the exemplary arrangement shown, biasing assembly 152 is operatively interconnected between piston 126 and end closure 150.

Piston 126 is shown in FIGS. 2-4 as including a first or proximal end 154 and an opposing second or distal end 156 with an outer side wall 158 extending generally therebetween. Disposed along proximal end 154 is an end wall 160 that includes a bottom wall portion 162 and a side wall portion 164 that extends radially outwardly from along the bottom wall portion toward outer side wall 158. A hole or passage 166 extends through end wall 160, such as in generally co-axial relation with axis AX, for example.

Provided along distal end 156 of piston 126 is an end wall 168 that can include one or more features or surfaces that are suitable for abuttingly engaging lower structural component LSC. Additionally, piston 126 can include one or more features or elements for securing the piston on or along the lower structural component. In the exemplary embodiment shown, end wall 168 of distal end 156 includes a securement feature, such as a threaded hole 170 is disposed in approximate alignment with an opening OPN in the lower structural component, for example, that adapted to receive a securement device, such as a threaded fastener 172, for example.

The second end member can also include one or more cavities or compartments formed therein, such as may be desirable for manufacturing or weight reduction purposes, for example. In the exemplary embodiment shown in FIGS. 2-4, piston 126 includes an inner side wall 174 that at least partially defines a central cavity 176. An outer cavity 178 is at least partially defined between the inner side wall and outer side wall 158. Optionally, a plurality of connector walls 180 can extend between the inner and outer side walls and thereby separate the outer cavity into a plurality of smaller outer cavities.

As mentioned above, the biasing assembly can be operatively connected between the second end of the flexible wall and the second end member in any suitable manner. Preferably, this operative connection will permit the biasing assembly to urge the second end of the flexible wall into abutting engagement with the second end member under certain conditions of use of the gas spring assembly, such as under normal operating conditions as well as during fully compressed conditions (e.g., full jounce conditions). This operative connection will also, preferably, permit the second end of the flexible wall to be separated or otherwise disengaged from contact with the second end member under other conditions of use, such as during conditions of use beyond full extension of the gas spring assembly (e.g., full rebound conditions). That is, the biasing assembly preferably permits the gas spring assembly to operate normally under typical conditions of use (e.g., normally-loaded and highly compressed conditions), but also permits end of the flexible wall to separate from the second end member during over-extended conditions. This provides the gas spring assembly with an additional amount of extended length, which may be useful in avoiding damage to the gas spring assembly when tensioned.

While it will be appreciated that any suitable arrangement and/or configuration could alternately be used, biasing assembly 152 is shown in FIGS. 2-4 as being operatively connected along axis AX of gas spring assembly 102. As one example of an alternate arrangement, a plurality of biasing assemblies could be operatively connected between the end of the flexible wall and the second end member, such as by being positioned in spaced relation to one another outwardly from axis AX, for example.

Additionally, as mentioned above, a biasing assembly in accordance with the subject matter of the present disclosure can be of any suitable arrangement, configuration and/or construction and can include any suitable components or combination of components. For example, biasing assembly 152 is shown in FIGS. 2-4 as including an elongated connecting member 182 that extends through hole 166 and is operatively connected to end closure 150 along second end 132 of flexible wall 128. It will be appreciated that connecting member 182 can be secured to end closure 150 in any suitable manner. In the exemplary embodiment shown in FIGS. 2-4, end closure 150 includes a hole or passage 184 that is in approximate alignment with hole 166 such that at least a portion of connecting member 182 can extend therethrough. A suitable securement feature, such as a plurality of threads or a threaded bumper mount 186, for example, can be provided on or along end closure 150 and threadably receive a threaded end 188 of the elongated connecting member. A conventional jounce bumper 190 of any suitable type, kind and/or construction can optionally be included within spring chamber 134, such as by being received on bumper mount 186, for example.

Elongated connecting member 182 includes a distal end 192 that is disposed generally opposite threaded end 188. A radially-outwardly extending flange or seat 194 is provided along distal end 192 of the elongated connecting member. Flange 194 can be provided on the elongated connecting member in any suitable manner. For example, elongated connecting member 182 could take the form of a conventional shoulder bolt or other fastener that has a driving head 196 disposed along distal end 192 opposite threaded end 188. A washer, which may be of a conventional construction, can be disposed along the distal end in abutting engagement with driving head 196 and act as flange 194. In the alternative, head 196 could be of suitable size and shape to act as the flange. Additionally, a shoulder or bearing surface 198 can optionally be provided along elongated connecting member 182, such as may be suitable for abuttingly engaging end closure 150. While it may be preferred that a threaded assembly (e.g., an elongated connecting member with a threaded end that engages a threaded bumper mount) is used, such as to allow for ease of assembly, for example, it is to be understood that any other suitable configuration and/or arrangement (e.g., the use of non-threaded connections) can alternately be used.

Biasing assembly 152 also includes at least one biasing element, such as at least one of a mechanical biasing device, an electromagnetic biasing device or a pneumatic biasing device. Examples of mechanical biasing devices can include, without limitation, coil springs, wave springs, disc springs and a solid elastomeric springs. An example of an electromagnetic biasing device includes, without limitation, an electromagnetic actuator. An example of a pneumatic biasing device includes, without limitation, a pressurized gas spring or actuator. In the exemplary embodiment in FIGS. 2-4, biasing assembly 152 is shown as including a single biasing element 200, such as in the form of a coil spring, for example, that is disposed along elongated connecting member 182 between flange 194 and bottom wall portion 162 of the second end member. As discussed above, however, it will be appreciated that any other suitable arrangement, configuration and/or construction could alternately be used.

Turning, now, to the use and operation of a gas spring assembly in accordance with the subject matter of the present disclosure, the same will operate in a conventional manner both during normal loading conditions, such as the condition shown in FIG. 2, for example, as well as under highly compressed conditions, such as the condition shown in FIG. 3, for example. That is, a gas spring assembly that includes a biasing device as described herein, such as gas spring assembly 102, for example, will maintain the end (e.g., second end 132) of the flexible wall in contact with the corresponding end member (e.g., piston 126) that is operatively connected thereto by the biasing assembly. Additionally, as the gas spring assembly is displaced into a compressed condition, such as is indicated by reference dimension D2 in FIG. 3, for example, this contact between the end of the flexible wall and the corresponding end member will continue to be maintained. In these circumstances and under at least these conditions of operation, the subject gas spring assembly will operate in a substantially conventional manner. It will be recognized that dimension D2 represents a second distance that is less than the first distance represented by dimension D1 in FIG. 2.

However, upon being extended beyond a normal range of operation, a gas spring assembly in accordance with the subject matter of the present disclosure, such as gas spring assembly 102, for example, will operate differently than a conventional gas spring assembly. That is, as the associated structural components (e.g., upper and lower structural components USC and LSC) begin to separate beyond the distance represented by dimension D1 in FIG. 1, flexible wall 128 will being to roll off of piston 126 until the flexible wall is stretched out and rolling lobe 134 has been eliminated. Under such conditions, the biasing assembly (e.g., biasing assembly 152) will act to maintain the end (e.g., second end 132) of the flexible wall in contact with the corresponding end member (e.g., piston 126) that is operatively connected thereto by the biasing assembly. As further separation of the associated structural components occurs, however, an over-extended condition of the gas spring assembly may be reached in which the flexible wall becomes tensioned. Such a condition is generally represented in FIG. 4 by reference dimension D3, which represents a third distance that is greater than the first distance associated with dimension D1. Once the tension force exceeds the biasing force generated by the biasing assembly (e.g., biasing assembly 152), further separation of the associate structural components will result in the end of the flexible wall being separated from the corresponding end member, as is represented by reference dimension D4 in FIG. 4.

The aforementioned separation of the end of the flexible wall from the corresponding end member is attributable to the compliance of the biasing assembly. In the exemplary embodiment shown in FIG. 4, the tension forces, which are represented by arrows TF, are acting to draw the flexible wall and the corresponding end member away from one another. As such displacement begins to occur, end closure 150 moves away from bottom wall portion 162 of end wall 160 and elongated connecting member 182 is displaced along passage 166. This displacement of the elongated connecting member urges flange 194 toward the bottom wall portion of end wall 160, which compresses biasing element 200 and acts to provide controlled relative movement between the components in the axial direction.

While not shown, an additional washer can be positioned between bottom wall portion 162 and biasing element 200 without detracting from this arrangement. As elongated connecting member 182 displaced axially outwardly from central cavity 176 and through passage 166, bumper mount 186 holds the assembly together and captures end closure 150 against shoulder 198 such that the end closure is fixed relative to the elongated connecting member. Thus, while in an assembled condition, in which end closure 150 is secured to the elongated connecting member, piston 126 and second end 132 of the flexible wall can move relative to one another, while remaining biased toward one another by biasing element 200.

It will be appreciated that such an extended (or over-extended) condition, could occur, for example, during a full rebound condition or if the vehicle is lifted, such as during service, for example. It is beneficial, then, that the subject arrangement both allows extra extension of gas spring assembly 102, such as by the amount represented by dimension D4, for example, without significant change in the design or other operational characteristics of the gas spring assembly. Additionally, once any such over-extension condition has abated, the biasing assembly will assist in returning the end of the flexible wall and the second end member into the desired and proper orientation.

This controlled relative movement also includes a maximum allowed movement such that distance D4 has a maximum value that can be controlled or dictated by the particular application of the spring and/or the particular vehicle. Further, this maximum distance can be controlled merely by the limits of the biasing member wherein once it has reached full compression, the relative movement will stop. If the biasing member is a spring, this would be once the spring has reached a "solid height" in which each convolution of the spring is engaging the adjacent convolution.

However, in another embodiment, gas spring assembly 102 and/or biasing assembly 152 can further include a stop or extension-limiting device 202 that is configured to limit the magnitude or amount of controlled relative movement of which the biasing assembly may be capable. This, for example, may be useful in minimizing the effect of impacts on the biasing element and/or to better control the maximum value of the displacement, which is represented by dimension D4. Stop 202 can be a component of biasing element 200 or, alternately, can be supplied separately from the biasing assembly. In one embodiment, a maximum allowed amount of movement could be any amount greater than approximately one-eighth of an inch, with an upper extent of the movement not specifically controlled. This configuration could, for example, be useful to reduce impact loads associated with uncontrolled over-extension of the gas spring assembly. In another embodiment, a maximum allowed movement could also have a predefined upper end, such as an amount of approximately two and one half inches, for example. As can be appreciated, this upper end and even the lower end can be dictated by the particular construction and/or characteristics of the vehicle as well as any other suitable criteria, such as suspension geometry, for example. In a further embodiment, the maximum allowed movement could be within a range of from approximately three-eighths of an inch to approximately two inches. In another embodiment, the maximum allowed movement could be within a range of from approximately one-half of an inch to approximately one and one-half inches.

As used herein with reference to certain elements, components and/or structures (e.g., "first end" and "second end"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly capable of use between an associated sprung mass and an associated unsprung mass, said gas spring assembly comprising:
a first end member adapted for securement on one of the associated sprung and unsprung masses;
a second end member disposed in spaced relation to said first end member and defining an axis of motion therebetween, said second end member adapted for securement on the other of the associated sprung and unsprung masses;
a flexible wall having a first end, an opposing second end and a chamber at least partially defined therebetween, said first end secured to said first end member such that a substantially fluid-tight seal is formed therewith;
an end closure shaped to cooperatively engage said second end member, said end closure extending across said second end such that a substantially fluid-tight seal is formed between said flexible wall and said end closure; and,
a biasing assembly joining said flexible wall to said second end member, said biasing assembly disposed along an elongated connecting member between a flange and said second end member, said biasing assembly allowing controlled biasing movement between said second end of said flexible wall and said second end member wherein contact between said flexible wall second end and said second end member is maintained by said biasing member during relative movement of said flexible wall and said second end member as at least a portion of said flexible wall moves off of said second end member;
said biasing assembly includes a biasing element, said flange, and a stop member inserted and operatively connected between said flange and said second end member, said stop member and said flange are urged toward said second end member to compress said biasing element and limit said controlled biasing movement.

2. A gas spring assembly according to claim 1, wherein said second end member includes a first end disposed toward said first end member, a second end disposed away from said first end member relative to said first end and a recess formed into said first end, said recess shaped to at least partially receive said end closure, said biasing assembly urging said end closure into said recess.

3. A gas spring assembly according to claim 2, wherein said second end member includes a first end wall disposed along said first end that at least partially defines said recess and a mounting opening extending through said first end wall within said recess, said end closure including a hole extending therethrough, said elongated member extending through said mounting opening and said hole such that said second end member is interconnected with said end closure, and said biasing element is operatively interconnected between said elongated member and said second end member such that said biasing element at least partially provides said controlled biasing movement between said flexible wall and said second end member.

4. A gas spring assembly according to claim 1, wherein said controlled biasing movement has a maximum allowed movement and said maximum movement is within a range of from approximately 0.1 inches to approximately 2.5 inches.

5. A gas spring assembly comprising:
a first end member;
a second end member spaced from said first end member;
a flexible wall extending between said first end member and said second end member that at least partially defines a spring chamber therebetween; and,
a biasing assembly disposed along an elongated connecting member between a flange and said second end member, said biasing assembly operative to urge an end of said flexible wall into abutting engagement with said second end member and to maintain contact of said flexible wall and said second end member during relative movement of at least a portion of said flexible wall off of said second end member and operative to permit said end of said flexible wall to be separated a distance from said second end member while in an assembled condition;

said biasing assembly includes a biasing element and a stop member inserted between said flange and said second end member, said stop member housing said biasing element which is operatively urged toward said second end member to compress said biasing element to limit said controlled relative movement between said flexible wall and said second end member.

6. A gas spring assembly according to claim 5, wherein:
said second end member includes a first end, an opposing second end, an outer side wall extending between said first and second ends and at least partially defining an interior between said first and second ends, and an end wall disposed along said first end that has opposing first and second sides with said second side disposed within said interior of said second end member;
said flexible wall includes opposing first and second ends with said first end engaging said first end member and said second end disposed along said first side of said end wall of said second end member; and,
said biasing element is positioned within said interior of said second end member on said second side of said end wall.

7. A gas spring assembly according to claim 6, wherein said biasing element includes one of a mechanical biasing device, an electromagnetic biasing device and a pneumatic biasing device.

8. A gas spring assembly according to claim 7, wherein said mechanical biasing device includes mechanical spring device selected from the group consisting of a coil spring, a wave spring, a disc spring and a solid elastomeric spring.

9. A gas suspension system according to claim 6, wherein said end wall of said second end member includes an opening extending therethrough, and said elongated connecting member has a proximal end and a distal end, said proximal end operatively connected along said second end of said flexible wall with said distal end of said elongated connecting member disposed along said second side of said end wall.

10. A gas suspension system according to claim 9, wherein said elongated connecting member includes a radially-outwardly extending flange disposed along said distal end of said elongated connecting member and said biasing element is compressively positioned between said flange and said end wall of said second end member.

11. A gas suspension system according to claim 10, wherein said flange is disposed a first distance from said second side of said end wall when said second end of said flexible wall is in abutting engagement with said first side of said end wall, and said biasing assembly includes an extension-limiting device disposed between said second side of said end wall and said flange along said distal end of said elongated connecting member, said extension-limiting device having a minimum nominal height that is less than said first distance.

12. A gas suspension system for use on an associated vehicle that includes an associated sprung mass and an associated unsprung mass, said gas suspension system comprising:
an upper structural member of the associated sprung mass;
a lower structural member of the associated unsprung mass that is spaced apart from said upper structural member and displaceable relative thereto; and,
a gas spring assembly operatively connected between said upper structural member and said lower structural member, said gas spring assembly including:
an end member secured on said upper structural member;
a piston spaced from said end member and secured on said lower structural member;
a flexible wall extending between said end member and said piston that at least partially defines a spring chamber therebetween; and,
a biasing assembly disposed along an elongated connecting member between a flange and said piston operative to urge an end of said flexible wall into abutting engagement with said piston and to maintain contact of said flexible wall with said piston during movement of said flexible wall with respect to said piston and operative to permit said end of said flexible wall to be disengaged from said piston while in an assembled condition; said flange is a radially-outwardly extending flange disposed along a distal end of an elongated connecting member, said biasing assembly includes a biasing element compressively positioned between said flange and said piston, and a stop member inserted and operatively connected between said flange and said piston, said stop member and said flange are urged toward said piston to compress said biasing element and to limit controlled relative movement between said flexible wall and said piston;
said upper and lower structural members capable of being spaced a first distance from one another at which said gas spring assembly is at a full operating height in which said end of said flexible wall of said gas spring assembly is in abutting engagement with said piston thereof;
said upper and lower structural members capable of being spaced a second distance from one another that is less than said first distance and at which said gas spring assembly is at a collapsed height; and,
said upper and lower structural members capable of being spaced a third distance from one another that is greater than said first distance and at which said gas spring assembly is extended beyond said full operating height such that said end of said flexible wall of said gas spring assembly is disengaged from said piston.

13. A gas suspension system according to claim 12 further comprising:
a pressurized gas source operative to a quantity of pressurized gas;
a gas transmission line fluidically interconnected between said gas spring assembly and said pressurized gas source;
a gas control device fluidically interconnected between said gas spring assembly and said pressurized gas source and operative to selectively control gas flow therebetween; and,
a control system in communication with at least said gas control device for selective operation thereof.

14. A gas suspension system according to claim 12, wherein said piston includes an end wall having opposing first and second sides, said end of said flexible wall disposed along said first side, and said biasing element is positioned along said second side of said end wall.

15. A gas suspension system according to claim 14, wherein said biasing element includes a mechanical spring device selected from the group consisting of a coil spring, a wave spring, a disc spring and a solid elastomeric spring.

16. A gas suspension system according to claim 14, wherein said end wall of said piston includes an opening extending therethrough, and said elongated connecting member has a proximal end and a distal end, said proximal end operatively connected along said second end of said flexible wall on said first side of said end wall, and said distal end of said elongated connecting member disposed along said second side of said end wall.

17. A gas suspension system according to claim 16, wherein said flange is disposed a first distance from said second side of said end wall when said second end of said flexible wall is in abutting engagement with said first side of said end wall.

* * * * *